Aug. 9, 1966     S. T. GOLDEN     3,265,011
CONVEYOR SUSPENSION TRACK STRUCTURE
Filed Dec. 30, 1963     2 Sheets-Sheet 1
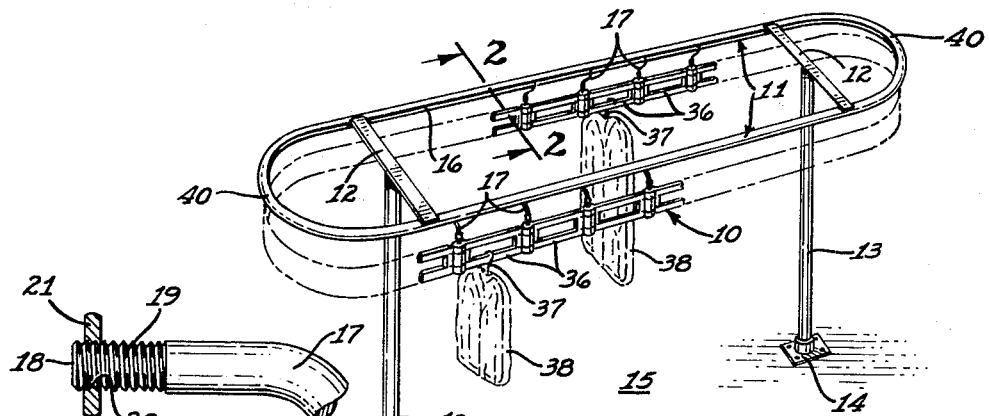
Fig.1
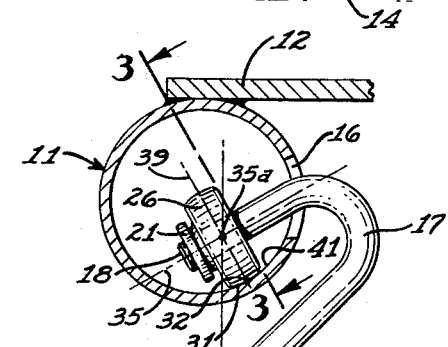
Fig.5
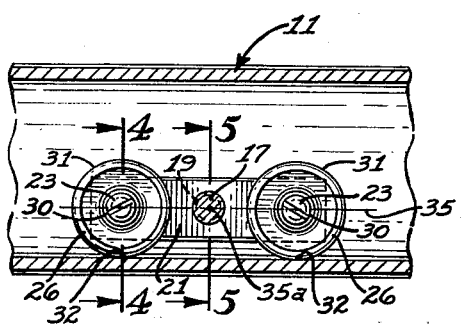
Fig.3
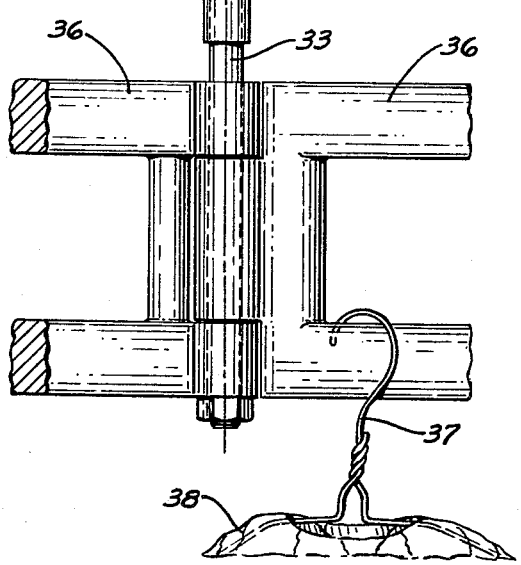
Fig.2
Fig.4
INVENTOR.
STEVE T. GOLDEN.
BY
Willard S. Brown
ATTORNEY.

Aug. 9, 1966 S. T. GOLDEN 3,265,011
CONVEYOR SUSPENSION TRACK STRUCTURE
Filed Dec. 30, 1963 2 Sheets-Sheet 2

INVENTOR.
STEVE T. GOLDEN
BY
Willard S. Grove
ATTORNEY

United States Patent Office 3,265,011
Patented August 9, 1966

3,265,011
CONVEYOR SUSPENSION TRACK STRUCTURE
Steve T. Golden, 258 Banner Ave., Ventura, Calif.
Filed Dec. 30, 1963, Ser. No. 334,475
2 Claims. (Cl. 104—93)

This invention pertains to a conveyor suspension system and is particularly directed to an improved conveyor suspension track structure.

One of the objects of this invention is to provide a conveyor suspension track structure which is neat in appearance and sanitary and clean in operation.

Another object of this invention is to provide an endless conveyor which is capable of making vertical and horizontal curves without the use of external guide wheels at the turns.

A further object is to provide a conveyor in which the suspension rollers and associated mechanism is totally enclosed and protected from contamination from dust falling from the area in which it is used.

It is also an object to provide a conveyor suspension track system enclosed in such a manner that dirt and worn materials from the suspension rollers and track do not fall or drop on the materials and objects hanging from the conveyor.

It is still further an object to provide a tubular track structure having a slotted side from which the suspension hooks issue while the associated roller trucks are totally enclosed within the tubular track.

Further features and advantages of this invention will appear from a detailed description of the drawings in which:

FIG. 1 is a perspective view of an endless suspension track structure incorporating the features of this invention.

FIG. 2 is an enlarged fragmentary sectional view on the line 2—2 of FIG. 1.

FIG. 3 is a fragmentary sectional view on the line 3—3 of FIG. 2.

FIG. 4 is a sectional view on the line 4—4 of FIG. 3.

FIG. 5 is a sectional view on the line 5—5 of FIG. 3.

Figure 7:
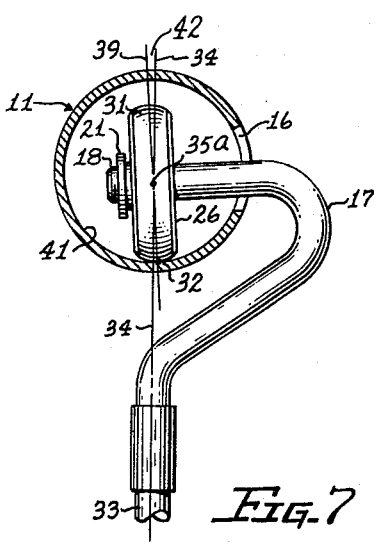
FIG. 7 is an enlarged cross-sectional view of the line 7—7 of FIG. 6.

As an example of one embodiment of this invention there is shown an endless conveyor indicated generally at 10, FIG. 1, particularly well adapted for laundry and dry cleaning establishments comprising an endless tubular track 11 carried on suitable transverse supports 12 fixed to the top of upright standards 13 mounted by floor flanges 14 to the floor 15. In the side of the tubular track 11 is formed a slot 16 through which the suspension hook 17 extends, its inner end 18 being threaded at 19 and pivotally received in a mating threaded bore 20 formed in the truck plate 21.

At each end of the truck plate 21 is formed threaded bores 22 which receive the bearing screws 23 which pass through the bores 24 of the bearing bushings 25 to securely lock the bushings 25 to the truck plate 21. Rollers 26 have bores 27 which are journaled on the outside diameter 28 of the bushings 25 and confined against axial movement between the face 29 of the truck plate 21 and the flange 30 of the bushings 25. The outer periphery 31 of the rollers 26 is adapted to roll along inside the bottom portion of the tubular track 11 at the point 32.

The suspension hook 17 terminates at its lower end in a vertical shank portion 33 whose axis 34 extends upwardly to intersect a plane defined by the axes of rotation 35 of the rollers at the point 35a. Interlocking coat hanger links 36 are hinged on the vertical shank portions 33 of the suspension hooks 17 upon which may be hung the coat hangers 37 containing the clothes 38. The endless chain conveyor links 36 and connected suspension hooks 17 may be manually pushed about the track 11 or may be power actuated by any suitable apparatus, not shown.

It will be noted, FIG. 2, that the radial plane 39 is angularly disposed relative to the vertical axis 34 of the load carrying shank 33 and that with slot 16 located on the inside of the curved portions 40 of the track 11, the rollers 26 ride up against the surface 41 at point 32 to absorb horizontal thrust as the endless conveyor links 36 go around the corners 40 of the track 11 without any addition guides means being required. Also, it will be noted that the truck structures comprising the rollers 26 and truck plates 21 are totally enclosed within the tubular track 11 so that dust and dirt does not accumulate on these mechanisms nor can particles from the rollers 26 and tubular track 11 drop upon and soil the cleaned clothes 38 hanging below on the links 36.

Figure 8:
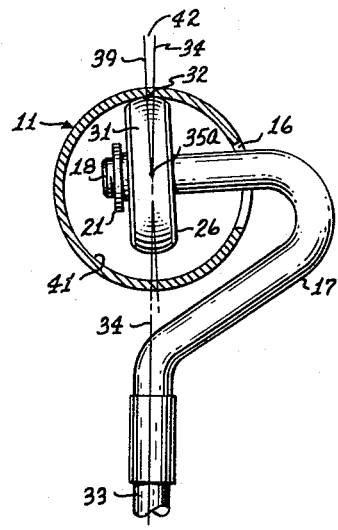
FIG. 8 is an enlarged cross-sectional view on the line 8—8 of FIG. 6.
Figure 6:
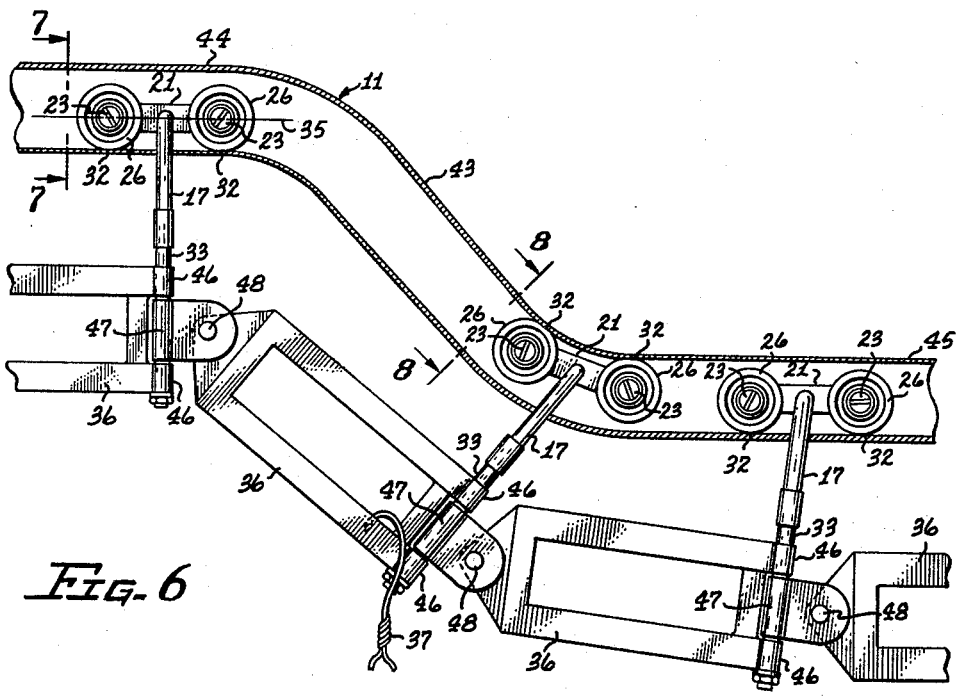
FIG. 6 is an enlarged fragmentary side elevation of a conveyor having a slope and change of height.

In the arrangement shown in FIGS. 6, 7, and 8, the inside surface bore 41 of the endless tubular track 11 may preferably be just slightly larger than the diameter of the rollers 26 and the angle between the vertical shank portion axis 34 and radial plane 39 of the rollers may be relatively small, in the area of 3 to 4 degrees shown at 42 in FIGS. 7 and 8. In this arrangement the track may slope as at 43, FIG. 6, and have horizontal runs 44 and 45 at various elevations. One end of the coat hanger links 36 have axially spaced bearings 46 pivotally mounted and confined axially on the vertical shank portions 33 so as to rock around the vertical shank portion axes 39. Articulated links 47 are pivotally mounted and confined axially on the vertical shank portions 33 between the axially spaced bearings 46 so as to rock around the vertical shank portion axes 39. Each articulated link has a horizontally disposed pivot pin 48 upon which is pivotally mounted the other ends of the coat hanger links 37 from their spaced bearings 46 so that the links are connected together and free to swing relative to each other in both a horizontal and vertical plane. Thus the coat hanger link chain can follow around the curved end portions 40 of the track, such as shown in FIG. 1, and go up and down sloping portions of the track 11, as shown in FIG. 6 with equal ease while maintaining the loaded clothes hangers 37 in proper condition throughout the path of travel of the clothes hanger links 36. When the clothes hanger links travel from the sloping portion 43 of the track 11 to the horizontal portion 45, the rollers contact the top portion of the inside surface 11 at the top point 32 indicated in FIGS. 6 and 8, and may contact the bottom point 32 in FIGS. 6 and 7, as the slope 43 and horizontal portion 44 as the hanger line links 35 travel along.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A conveyor suspension structure comprising in combination:
 (A) a tubular track having a slot in the side thereof,
 (B) a suspension hook having its inner end extending through said slot into the interior of said tubular track,
 (C) a roller journaled against axial movement to rotate around an oblique axis on the inner end of said hook and arranged to roll at a point of contact on the bottom portion of the inside cylindrical surface of said tubular track, (D) a vertical shank portion on the lower outer end of said hook having a vertical axis defining a vertical plane parallel to said tubular track extending upwardly to intersect said oblique axis of rotation of said roller on the inner end of said hook, (E) said point of contact of the periphery of said roller with the said interior surface of said tubular track lying in a plane at right angles to the axis of rotation of said roller and passing through the point of intersection of said roller and said vertical plane defined by said shank axis.

2. A conveyor suspension structure comprising in combination:

(A) a tubular track having a slot in the side thereof, (B) a suspension hook having its inner end extending through said slot into the interior of said tubular track, (C) a roller journaled against axial movement to rotate around an oblique axis on the inner end of said hook and arranged to roll at a point of contact on the bottom portion of the inside cylindrical surface of said tubular track, (D) a vertical shank portion on the lower outer end of said hook having a vertical axis defining a vertical plane parallel to said tubular track extending upwardly to intersect said oblique axis of rotation of said roller on the inner end of said hook, (E) said point of contact of the periphery of said roller with the interior surface of said tubular track being located between said vertical plane of said shank axis and and said slot in the side of said track and in a plane at right angles to the axis of rotation of said roller passing through the point of intersection of said roller and said vertical plane defined by said shank axis.

References Cited by the Examiner

UNITED STATES PATENTS

| | | | |
|---|---|---|---|
| 1,901,648 | 3/1933 | Howard | 16—98 |
| 2,715,966 | 8/1955 | Tieck | 211—94 |
| 2,768,733 | 10/1956 | Wilson | 198—177 |
| 3,010,584 | 11/1961 | Rutkovsky et al. | 211—121 |
| 3,011,456 | 12/1961 | Lyons | 104—172 |
| 3,023,878 | 3/1962 | Forsthoff et al. | 198—38 |

References Cited by the Applicant

UNITED STATES PATENTS

| | | |
|---|---|---|
| 1,768,493 | 6/1930 | Roddy. |
| 2,372,199 | 3/1945 | Hassler. |
| 2,880,878 | 4/1959 | Collette. |
| 2,899,072 | 8/1959 | Weiss. |
| 2,967,081 | 1/1961 | Kleinpenning. |
| 2,980,258 | 4/1961 | Collette. |
| 3,019,911 | 2/1962 | Collette. |
| 3,039,614 | 6/1962 | Rutkovsky et al. |
| 3,118,531 | 1/1964 | Rutkovsky et al. |
| 3,139,191 | 6/1964 | King. |

ARTHUR L. LA POINT, *Primary Examiner.*

MILTON BUCHLER, *Examiner.*

F. W. MONAGHAN, D. E. HOFFMAN,
*Assistant Examiners.*